United States Patent [19]

Pulling

[11] 3,981,520

[45] Sept. 21, 1976

[54] PROTECTIVE ENCLOSURE FOR PASSENGERS OF TRANSPORT DEVICES

[75] Inventor: Nathaniel H. Pulling, Framingham, Mass.

[73] Assignee: Liberty Mutual Insurance Company, Boston, Mass.

[22] Filed: May 5, 1975

[21] Appl. No.: 574,286

[52] U.S. Cl. .......................... 280/748; 180/103 A; 280/730; 296/65 R; 297/390; 297/216
[51] Int. Cl.² .......................................... B60R 21/10
[58] Field of Search ......... 280/150 B, 150 AB, 748; 180/82 R, 103 R, 103 A; 296/65 A, 65 R; 297/390, 216

[56] References Cited
UNITED STATES PATENTS

| | | | |
|---|---|---|---|
| 2,736,566 | 2/1956 | Hartl | 180/82 R |
| 2,818,909 | 1/1958 | Burnett | 296/65 A X |
| 3,129,017 | 4/1964 | Graham | 296/65 A |
| 3,423,124 | 1/1969 | Hewitt | 296/65 A |
| 3,591,232 | 7/1971 | Simon | 296/65 A X |
| 3,610,679 | 10/1971 | Amato | 296/65 A |
| 3,623,768 | 11/1971 | Capener | 280/150 AB X |
| 3,832,000 | 8/1974 | McDonnell | 296/65 A |
| 3,837,422 | 9/1974 | Schlanger | 280/150 AB X |
| 3,853,298 | 12/1974 | Libkie | 296/65 A |

FOREIGN PATENTS OR APPLICATIONS

| | | | |
|---|---|---|---|
| 537,159 | 4/1955 | Belgium | 296/65 A |
| 1,005,756 | 4/1952 | France | 296/65 A |

Primary Examiner—M. H. Wood, Jr.
Assistant Examiner—John P. Silverstrim
Attorney, Agent, or Firm—John E. Toupal

[57] ABSTRACT

A safety system for preventing injury to passengers of transport vehicles. In response to a collision each seat of the vehicle is automatically moved into a position wherein its occupant is protected within a structurally stable protective enclosure. Forming the enclosure are both movable portions secured to the seats and fixed portions secured to the vehicle. In a preferred embodiment of the invention, the movable seat is provided with a guidance system that normally facilitates selective adjustment of the seat into positions comfortable for its occupant but additionally produces automatic movement of the seat into the protective enclosure in response to a collision.

9 Claims, 10 Drawing Figures

PROTECTIVE ENCLOSURE FOR PASSENGERS OF TRANSPORT DEVICES

BACKGROUND OF THE INVENTION

This invention relates generally to a safety system for transport vehicles and, more particularly, to a combination safety seat and restraint mechanism for such vehicles.

Vehicle passenger safety systems of many types have been developed and proposed for reducing the number of serious and fatal injuries suffered by passengers of various kinds of transport vehicles and particularly of automotive vehicles. This activity has been greatly accentuated in recent years in response to pressures exerted by incumbent departments of both Federal and state governments.

Vehicle safety systems can be separated into several broad categories, one of which encompasses restraint systems including both active versions that require some form of passenger action and passive versions that do not. A serious drawback of active restraint systems is that even when available their use is generally ignored by a large segment of the motoring public. This is particularly true of the more cumbersome albeit more effective types such as shoulder and upper torso harnesses. Conversely, relatively simple active restraints such as the well-known lap belt, although utilized more extensively, are not satisfactorily effective in reducing serious injury and in certain instances can even become contributing factors thereto. For example, it has been demonstrated that at the time of a collision a passenger can sometimes slip under a lap belt and suffer internal injuries due to an abnormal compression on his abdomen by the belt. Passive restraint systems including primarily the highly publicized air bag systems similarly have failed for a number of reasons to provide an adequate level of vehicle passenger safety and, again, in many instances can even cause injury-related accidents. For example, the inadvertent activation of certain air bag systems can obscure the vision of an operator resulting in a loss of vehicle control and ultimate collision thereof with an encountered obstruction. Thus, prior restraint systems have failed to satisfy presently desired objectives for passenger safety.

Another category of vehicle safety systems features passenger seats that respond to collision by undergoing some form of movement intended to reduce the risk of injury to the seat's occupant. In most systems of this kind, collision-induced deceleration forces are employed to produce movement of a safety seat into a safer position, often into a postion for absorbing the forward momentum of its occupant. These movable safety seat systems likewise have proven either totally impractical or at least less than fully satisfactory for a variety of reasons including their use of movement mechanisms requiring activating force components not actually produced during typical collisions, their failure to insure that a passenger will be restrained in a safer position in the period immediately following an initial collision, a requirement for exorbitantly costly and cumbersome operating mechanisms; a tendency for critical components to be damaged during initial stages of collision and thereby prevent intended movement of a seat into a safer position; their failure to establish for a safety seat a final position in which an occupant is satisfactorily protected from all contingencies such as variously directed subsequent impacts experienced by a vehicle after an initial collision, etc.

The object of this invention, therefore, is to provide an improved safety system that will more reliably prevent personal injury to passengers of transport vehicles involved in accidental collisions.

SUMMARY OF THE INVENTION

The present invention is a safety system for preventing injury to passengers of transport vehicles. In response to a collision each seat of the vehicle is automatically moved into a position wherein its occupant is protected within a structurally stable protective enclosure. Forming the enclosure are both movable portions secured to the seats and fixed portions secured to the vehicle.

In a preferred embodiment of the invention, the movable seat is provided with a guidance system that normally facilitates selective adjustment of the seat into positions comfortable for its occupant but additionally produces automatic movement of the seat into the protective enclosure in response to a collision. The guidance system produces seat movement such that its base portion in one case is rising while its back portion moves toward a less inclined position and in the opposite case its base portion is lowering while its back portion moves toward a more inclined position.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
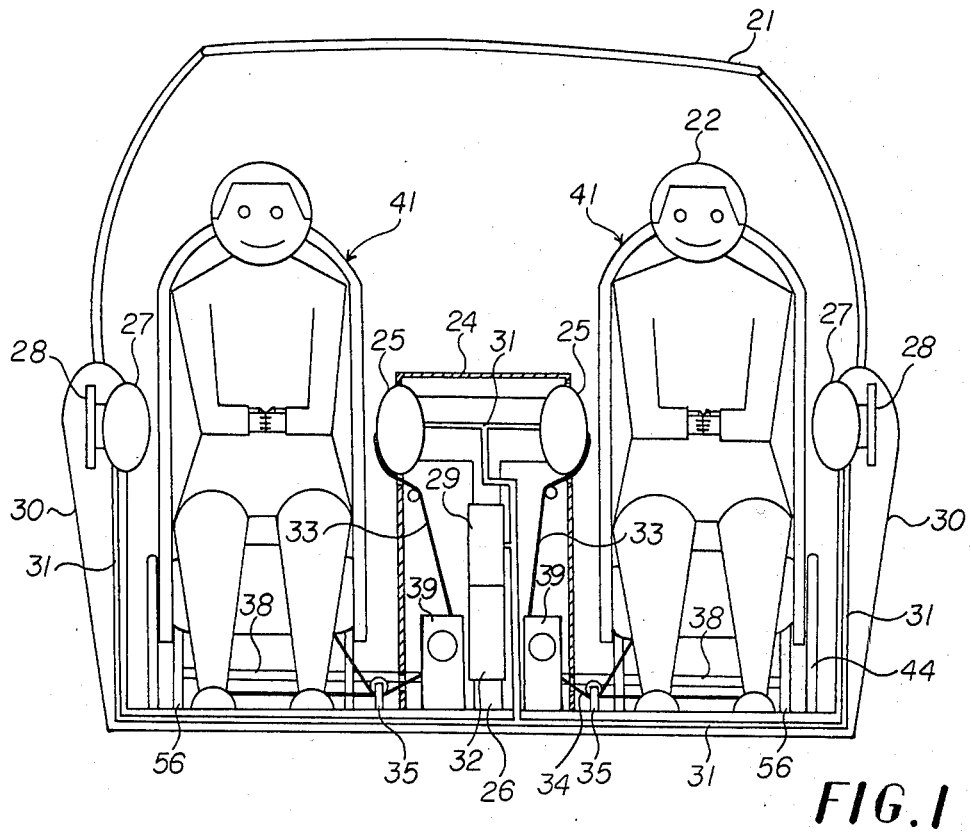
FIG. 1 is a partially broken away schematic front view of a vehicle equipped with a safety system of the present invention.
Figure 2:
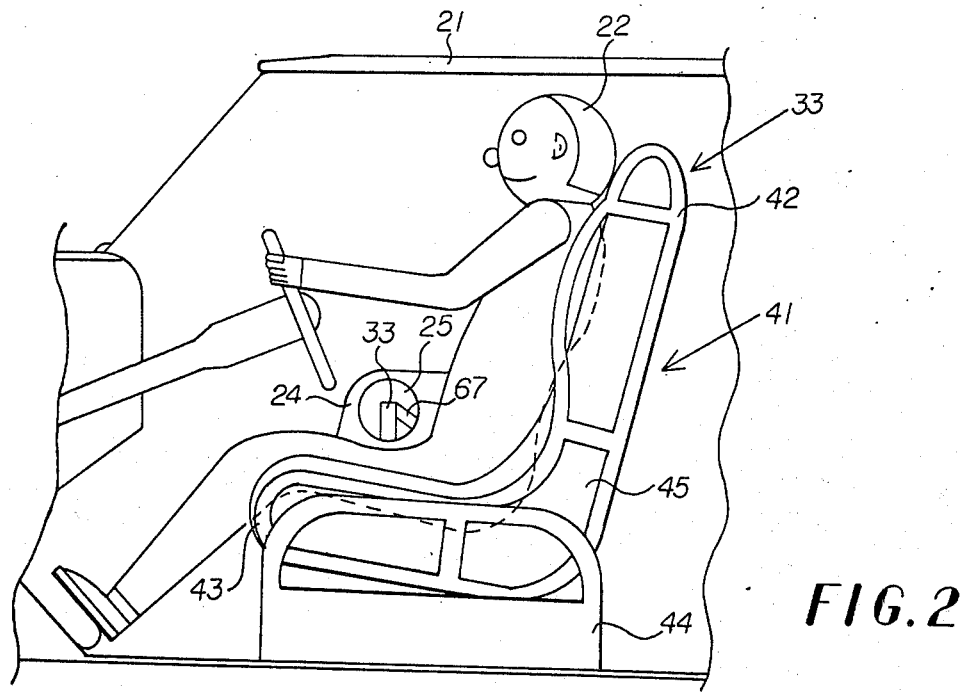
FIG. 2 is a partially broken away schematic side view of the vehicle and safety system shown in FIG. 1.
Figure 3:
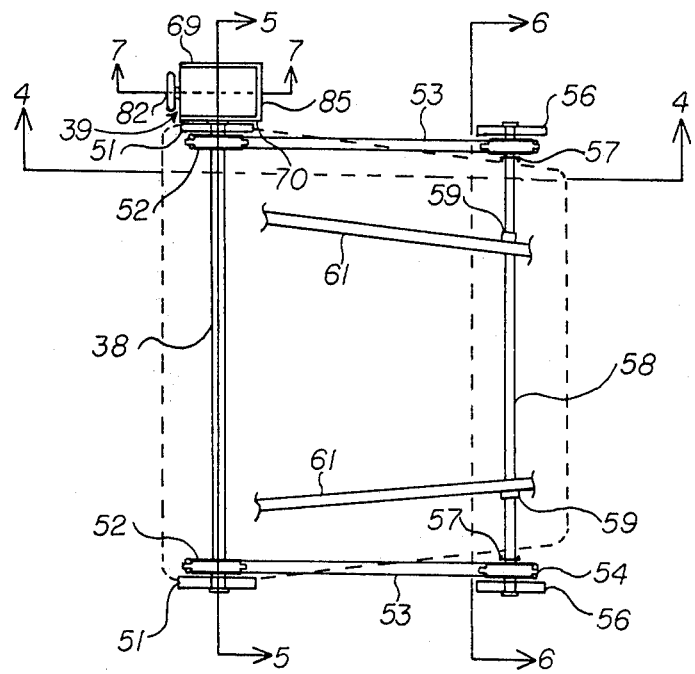
FIG. 3 is a plan view of a support structure for the safety seat shown in FIG. 2.

Referring not to FIGS. 1 and 2, there is shown a vehicle 21 for passengers 22 that are accommodated by a pair of seats 23. The seats 23 are constructed identically and, therefore, only one will be described in detail below. Positioned between the seats 23 is a console 24 that retains a pair of inboard air buffer bags 25 supported by a post 26. A pair of outboard air buffer bags 27 are supported by side-guard beams 28 in entry doors 30 of the vehicle 21. Also retained within the console 24 is a conventional pressurized gas supply 29 that is connected for selectively supplying pressurized gas to a manifold 31 extending to each of the bags 25 and 27. The release of gas from the supply 29 into the manifold 31 is controlled by a collision detector 32 which can be any of the well-known types including, for example, radar, ultrasonic or optical motion detectors, deceleration sensors, etc. Secured to each of the inboard bags 25 is one end of a mainstay 33 having an opposite end firmly secured to a connector 36 on the floor of the vehicle 21. Two belt extensions 34 secured to each of the mainstays 33 pass over guide rollers 35 and have ends attached to the undersupports of the seats 23 as disclosed in greater detail below. Also extending between those under-supports and a pair of control boxes 39 in the console 24 are a pair of drive shafts 38. The mainstays 33 and the extensions 34 comprise straps made of a material that resists stretching so as to maintain their initial length when subjected to tensile stress during a collision.

As shown in FIG. 2, each of the seats 23 includes a protective framework 41 comprising a metal web structure formed by a pair of back portions 42 that straddle the torso of the passenger 22 and a pair of base portions 43 that straddle the thighs thereof. Also included in each of the protective frameworks 41 is a side guard 44 secured to the vehicle 21 between the base seat portion 43 and an entry door 30. Supported within each framework 41 is a conventional upholstered seat 45 for accommodating the passenger 22 in a seated position as shown.

Referring now to FIGS. 3-7 there is shown in detail a support and guide structure for one of the seats 23. A pair of front members 51 under the front corners of the seat 23 rotatably support the drive shaft 38 to which is keyed a pair of drive gears 52. Engaging the gears 52 are drive chains 53 that extend to driven gears 54 located below the rear corner of the seat 23. The driven gears 54 are rotatably supported by shafts 55 mounted on rear members 56. Fixed to each of the driven gears 54 is one end of a lever arm 57, the opposite end of which is pivotally attached to an end of a rear cross member 58. A pair of connectors 59 secure the cross member 58 to under members 61 that form a part of the seat framework 41.

Figure 4:
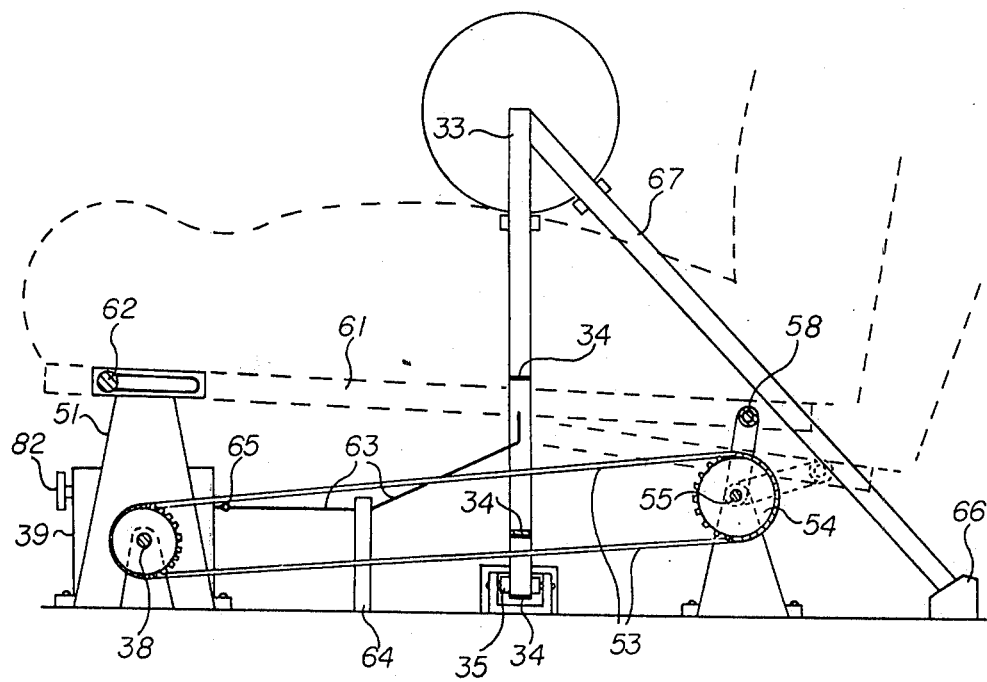
FIG. 4 is a cross-sectional view taken along lines 4-4 of FIG. 3.
Figure 5:
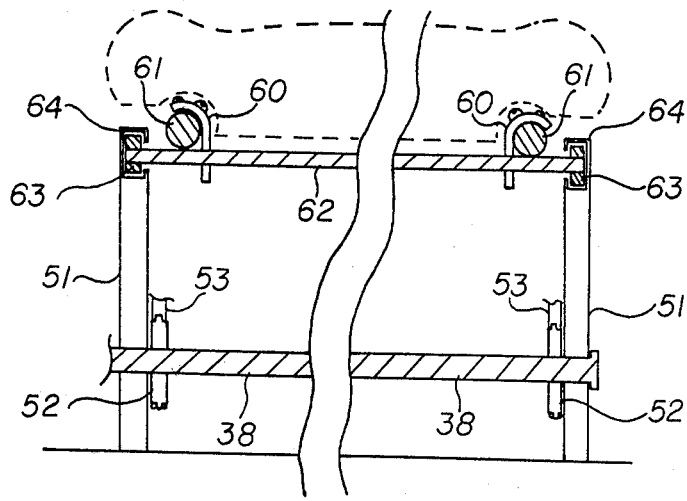
FIG. 5 is a cross-sectional view taken along lines 5—5 of FIG. 3.
Figure 6:
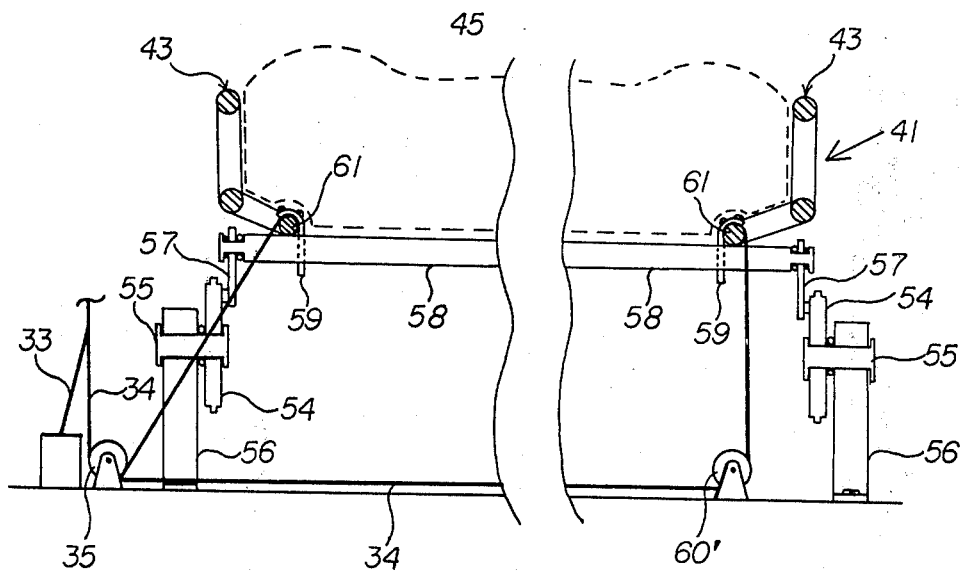
FIG. 6 is a cross-sectional view taken along lines 6—6 of FIG. 3.

As shown most clearly in FIGS. 4 and 5 the framework 41 further includes a front cross member 62 that is fixed to the under members 61 with connectors 60 and has ends that support a pair of rollers 63. Mounted on the front members 51 are tracks 64 that guide rotational movement of the rollers 63 so as to produce substantially horizontal movement of the front cross member 62. Illustrated most clearly in FIGS. 4 and 6, one extension 34 of the inboard mainstay 33 passes around the roller 35 and is secured to one of the under members 61 while a second extension 34 extends around another guide roller 60 and is secured to the other under member 61. Also secured to the inboard mainstay 33 is one end of an actuator wire 63 that extends through an eyebolt 64 and has an opposite end attached to a retainer pin 65 in the control box 39. Additionally securing each of the bags 25 and 27 to rearwardly mounted retainers 66 is a backstay 67, one of which is shown in FIG. 4.

Figure 7:
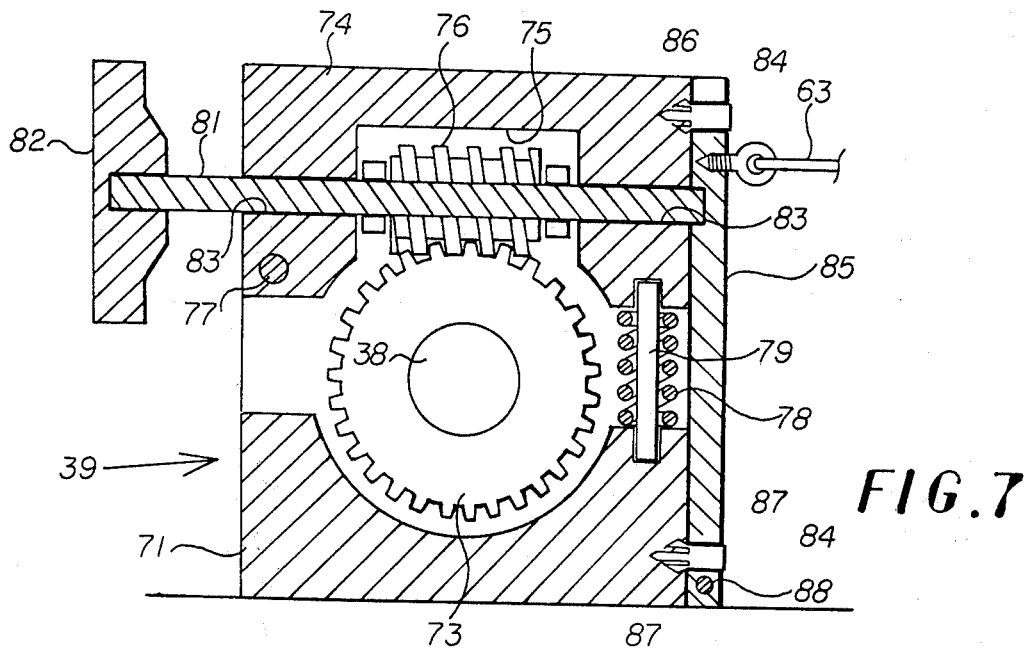
FIG. 7 is a cross-sectional view taken along lines 7—7 of FIG. 3.

Referring now to FIG. 7 there is shown in greater detail the control box 39. Retained between side plates 69 and 70 of the control box 39 is a base block 71 having a cylindrical channel 72 that accommodates a worm gear 73 fixed to the drive shaft 38. Also disposed between the plates 69 and 70 is a release block 74 having a rectangular channel 75 that accommodates a worm 76 that engages the worm gear 73. A front portion of the release block 74 is pivotally supported by a pin 77 that extends between the side plates 69 and 70. Urging pivotal movement of the block 74 about the pin 77 is a compression spring member 78 that is retained between the blocks 71 and 74 by a spring guide 79. A worm shaft 81 with a hand wheel 82 is fixed to the worm 76 and extends through openings 83 in the block 74 on either side of the channel 75. Pivotal movement of the block 74 is prevented by detented pins 84 that extend through openings in a rear plate 85 into holse 86 and 87 formed, respectively, in the release block 74 and the base block 71. The rear plate 85 is retained between the side plates 69 and 70 and a pair of lower pivot pins 88 that accommodate pivotal movement of the plate 85 as described below.

Figure 8:
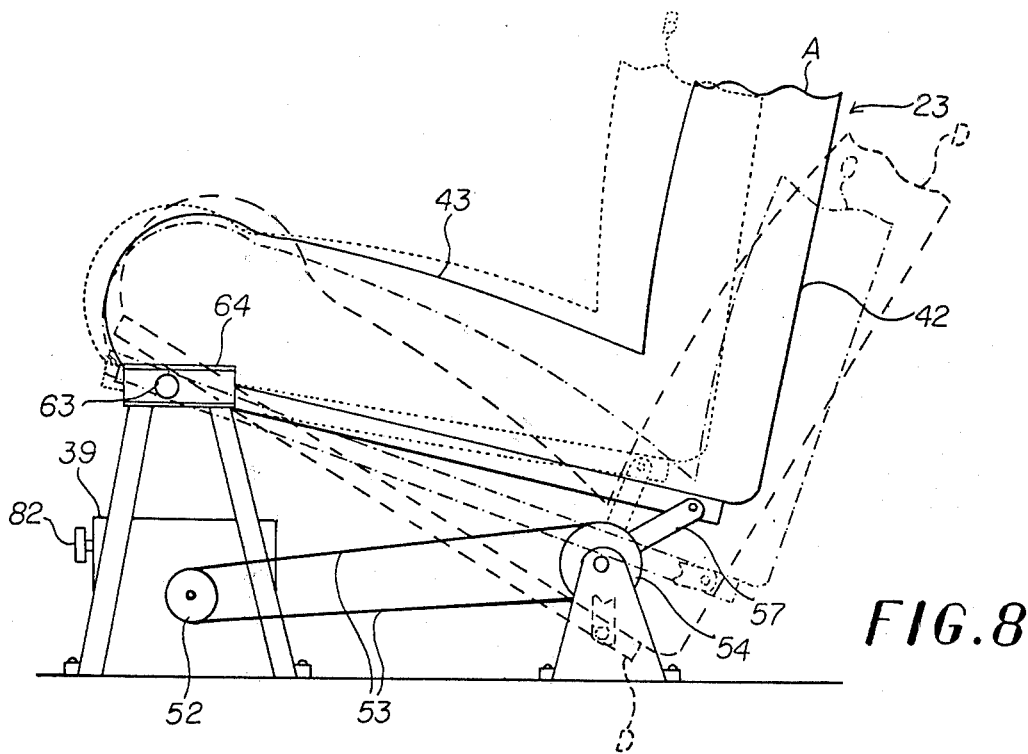
FIG. 8 is a schematic side view of the safety seat shown in FIG. 2 with dotted lines illustrating movement of the seat after deployment of the safety mechanism.

The movement of the seat 23 produced by the guide and support structure shown in FIGS. 4-7 is illustrated schematically in FIG. 8. During normal operation of the vehicle 21, the hand wheel 82 can be turned by the passenger to select a comfortable position for his seat 23. Rotation of the wheel 82 in one direction causes counterclockwise rotation (as seen in FIG. 8) of the sprocket driven gears 54 through a drive train consisting of the worm shaft 81, the worm 76, the worm gear 73, the drive shaft 38, the sprocket drive gears 52 and the sprocket chains 53. The resultant counterclockwise movement of the elevator levers 57 moves the rear porton of the seat 23 in a path having both upward and forward components while the front portion of the seat moves substantially horizontally in a forward direction as guided by the rollers 63 within the track 64. Conversely, rotation of the wheel in an opposite direction produces clockwise movement of the elevator levers 57 moving the rear seat portion along a path having both rearward and downward components while the front portion of the seat moves rearwardly within the constraint provided by the rollers 63 and the guides 64. Thus, the seat 23 can be moved selectively from an intermediate indicated by solid lines A in FIG. 8 toward a forward position illustrated by dotted lines B or toward a rearward position indicated by dotted lines C. During such adjustment of the seat 23, the base portion 43 in one case is rising while the back portion 42 moves toward a less inclined position both of which movements would be desired generally by a smaller person. In the opposite case the base portion 43 is lowering while the back portion 42 moves toward a more inclined position both movements of which normally would be desired by a larger person.

In response to a collision of the vehicle 21, the restraint system is actuated, in a manner described more fully below, to exert on the pin 65 a pulling force that pulls the back plate 85 away from the detent pins 84 as it pivots downwardly on the pivot pins 88. The release block 74 is then free to pivot upwardly on the pivot pin 77 in response to the bias provided by both the spring member 78 and a back force on the gears 73 and 76 generated by the activated restraint system as described hereinafter. This disengages the gears 73 and 76 allowing free movement of the drive shaft 38 as the seat 23 moves into a safer released position indicated by dotted lines D in FIG. 8. During movement of the seat 23 to its released position, the elevator levers 57 rotate approximately 180° from any of their normal positions in the range encompassed by seat positions A to C illustrated in FIG. 8.

Figure 9:
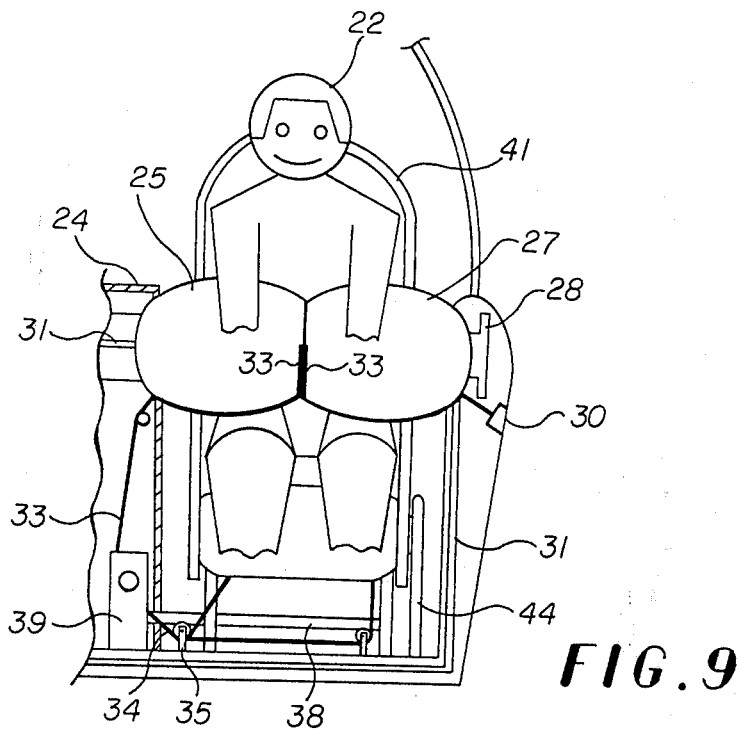
FIG. 9 is a schematic partial front view similar to that shown in FIG. 1 after deployment of the safety system.

The above-described operation is initiated by the sensor 32 (FIG. 1) which responds to either a collision or impending collision of the vehicle 21 by releasing from the source 29 pressurized gas that is supplied to the buffer bags 25 and 27 through the manifold 31. The resultant gas pressure inflates the bags 25 and 27 and forces them into position adjacent the seat occupant's abdomen as illustrated in FIG. 9. Release of the bags 25 and 27 from stored positions adjacent each side of the seats 23 facilitates extremely rapid deployment thereof into the strategically located, inflated positions illustrated. In thos positions the bags 25 and 27 form a continuous air cushion barrier that exerts a substantial longitudinal thrust that is retained by the side guard beams 28. The predetermined lengths of the mainstays 33 and the backstays 67 prevent the buffer bags 25 and 27 from moving up and they thereby restrain the thighs of the occupant. In addition, the side guard beams 28 prevent movement of the outboard bags 27 in forward, rearward and upward directions which movements of the inboard bags 25 are similarly restrained by the center post 26. Because of the stays 33 and 67 and the self-produced longitudinal thrust between the side beams 28, the buffer bags 25 and 27 are prevented from separation that would allow the occupant to pass between them against the front of the vehicle. Thus, the bags 25 and 27 form a barrier that prevents ejection of the passenger 22 from his seat in addition to centering his body and preventing him from striking injury-producing parts of the vehicle 21 in front of him, beside him, or on the roof.

During deployment of the bags 25, the mainstays 33 pull upon the actuator wire 63 to eliminate the holding function of the engaged gears 73 and 76 as described above. In addition, the extensions 34 pull on the cross member 61 (FIG. 6) producing a counterclockwise torque (as viewed in FIG. 8) on the seat 23 about the pivot pins 55. Thus, the belt extensions 34 function as powered operators that initiate movement of the seat 23 at the outset of a collision and thereby insure the attainment of the released position illustrated by dotted lines D prior to any component damage that would render the seat guidance mechanism dysfunctional.

Figure 10:
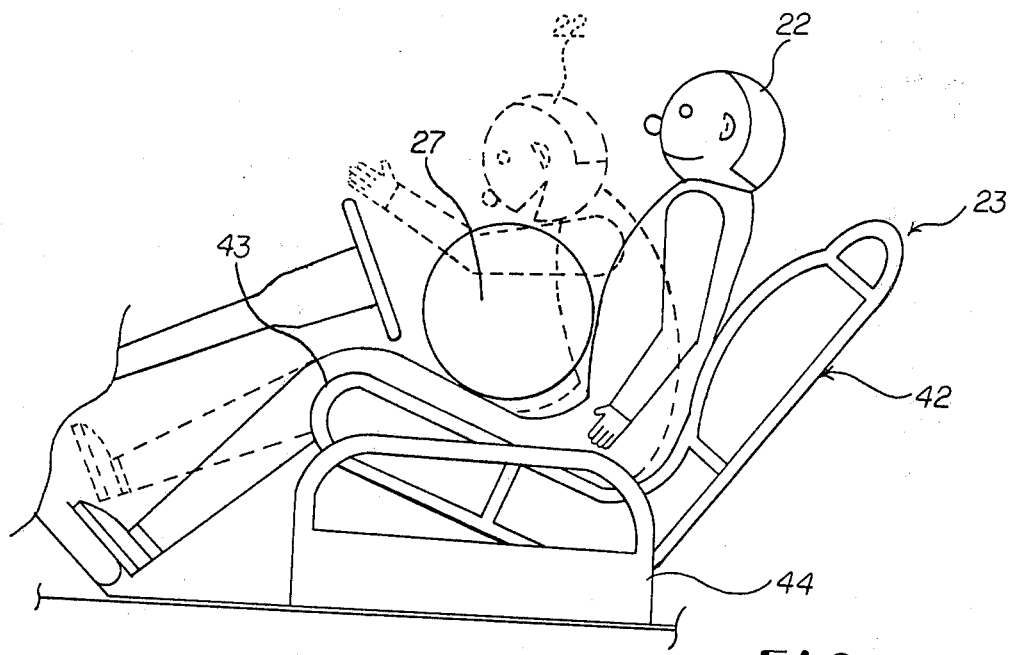
FIG. 10 is a schematic partial side view similar to that shown in FIG. 2 after deployment of the safety system.

In a preferred embodiment of the invention the buffer bags 25 and 27 are made from a highly resilient sheet material and the air source 29 is selected so as to provide for the inflated bags an internal gas pressure of at least 3 psi. The abovedescribed restraint system having these operating characteristics functions uniquely with the vehicle safety seat 23 in a manner schematically illustrated in FIG. 10. In the event of a forward collision of the vehicle 21, the buffer bags 25 and 27 are very rapidly inflated to form an approximately cylindrical cushion over which the upper part of the occupant's body 22 jackknifes as illustrated by dashed lines in FIG. 10. While absorbing this forward motion of the occupant 22, the relatively high-pressured resilient bags 25 and 27 convert a substantial quantity of the moving occupant's kinetic energy into accumulated potential energy in the form of compressed gas. At the conclusion of the occupant's forward motion, this accumulated energy is released in the form of an eleastic rebound of the bags 25 and 27 forcing the occupant's body back and down into the seat 23 as schematically illustrated by solid lines in FIG. 10. The bags 25 and 27 then retain the occupant 22 in a protective framework wherein his upper body portion is protected by the back seat portions 42, and his lower body portions are protected by the base seat portions 43 and the side guard 44. In addition, with the seat 23 having been previously forced into the released position illustrated by dotted lines D in FIG. 8 all vital portions of the occupant's body are spaced further from notoriously dangerous parts of the vehicle such as its steering wheel, front and roof portions and are retained at a minimum spacing from the side portions of the vehicle The occupant 22 is retained in that safer position during the period immediately following the initial collision so as to reduce the risk of injury resulting from consequential impacts that often accompany vehicle accidents.

Obviously, many modifications and variations of the present invention are possible in light of the above teachings. For example, the actuator wire 63 which relies upon the deployment of the bags 25 could be replaced by an explosively actuated latch pin that would be detonated by the sensor 32 to release the seat 23 for movement into its safer position. It is to be understood, therefore, that the invention can be practiced otherwise than as specifically described.

What is claimed is:

1. A vehicle safety system comprising:
   an occupant seat means;
   detector means activated in response to a collision condition of said vehicle;
   occupant restraint means movable into an occupant restraining position in response to activation of said detector means; and
   mover means for moving said seat into and occupant protecting position, activated by said restraint means moving into said restraining position.

2. A system according to claim 10 wherein said mover means comprises guide means for guiding movement of said seat means from a normal position into said protection position, and said restraint means maintains the passenger in said seat means during movement thereof.

3. A system according to claim 2 including a protective framework comprising a stationary portion secured to said vehicle and positioned to enclose a portion of said seat means after movement thereof into said protecting position.

4. A system according to claim 3 wherein said stationary portion comprises a pair of rigid structurally protective units positioned on opposite sides and below said seat means, and said guide means guides said seat means downwardly between said protective units.

5. A system according to claim 4 wherein said seat means comprises a base seat portion for accommodating the buttocks of the passenger and a back rest seat portion for accommodating the back thereof, said protective framework further comprises a movable portion straddling said back rest seat portion, and said base seat portion moves between said protective units.

6. A system according to claim 5 including seat adjustment means for selectively adjusting the position of said seat means.

7. A system according to claim 6 wherein said seat adjustment comprises drive means for moving said seat means, and said guide means guides movement that simultaneously either elevates said base seat portion and moves said back rest portion toward said front end or lowers said base seat portion and moves said back rest portion away from said front end.

8. A system according to claim 7 wherein said guide means comprises a forward guide means coupled to a front portion of said base portion and a rear guide means coupled to a rear seat portion thereof, said forward guide means producing substantially horizontal reciprocative movement of the said front seat portion, and said rear guide means producing arcuate movement of said rear seat portion.

9. A system according to claim 8 wherein said rear guide means comprises a pivot means that moves said rear seat portion through an arc of substantially 180° during movement of said seat means into said protecting position.

* * * * *